(12) United States Patent
Reeder et al.

(10) Patent No.: US 10,711,076 B2
(45) Date of Patent: Jul. 14, 2020

(54) MOBILE VACUUM DISTILLATION UNIT FOR TRANSPORT OF ARTICLES CONTAINING RELEASABLE VOLATILE ORGANIC COMPOUNDS

(71) Applicant: GM GLOBAL TECHNOLOGY OPERATIONS LLC, Detroit, MI (US)

(72) Inventors: Wayne E. Reeder, Grand Blanc, MI (US); Thomas J. Chapaton, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/204,814

(22) Filed: Nov. 29, 2018

(65) Prior Publication Data
US 2020/0171405 A1     Jun. 4, 2020

(51) Int. Cl.
    *C08F 6/00*     (2006.01)
    *B29C 71/00*     (2006.01)
    (Continued)

(52) U.S. Cl.
CPC .............. *C08F 6/005* (2013.01); *B01D 3/007* (2013.01); *B01D 3/106* (2013.01); *B01D 5/006* (2013.01);
(Continued)

(58) Field of Classification Search
CPC ........ B01D 3/007; B01D 3/106; B01D 5/006; B01D 5/0009; B29C 71/00;
(Continued)

(56) References Cited

U.S. PATENT DOCUMENTS 3,558,436 A * 1/1971 Foley ................... C02F 1/16
    202/196
3,748,234 A * 7/1973 Pottharst ............... B01D 1/289
    202/187
(Continued)

FOREIGN PATENT DOCUMENTS

WO     WO2014003528 A1 *    1/2014     ...... B01D 1/0058

OTHER PUBLICATIONS

WO2014003528A1_ENG (Espacenet machine translation of Toumi) (Year: 2014).*
(Continued)

*Primary Examiner* — Jonathan Miller
*Assistant Examiner* — Gabriel E Gitman
(74) *Attorney, Agent, or Firm* — Reising Ethington P.C.

(57) ABSTRACT

A mobile vacuum distillation unit for extracting, condensing, and collecting volatile organic compound vapor emissions from one or more polymer-containing articles includes a shell that defines an enclosed interior space and is mounted to a transportable support platform, a vacuum distillation vessel, a condenser, a condensate storage tank, and a vacuum pump system in fluid communication with a vacuum distillation chamber of the vacuum distillation vessel. The vacuum distillation chamber that includes the one or more polymer-containing articles from which the VOC vapor emissions are extracted may be heated by an exhaust gas heat exchanger if the transportable support platform is connected to and hauled by a tractor unit powered by a diesel engine. A method of using the mobile vacuum distillation unit to extract VOC vapor emissions from one or more polymer-containing article during transportation of the one or more polymer-containing articles between geographically separate destinations is also disclosed.

18 Claims, 2 Drawing Sheets

(51) Int. Cl.
  *B01D 5/00* (2006.01)
  *B01D 3/10* (2006.01)
  *C08J 7/00* (2006.01)
  *B01D 3/00* (2006.01)

(52) U.S. Cl.
  CPC ............ *B01D 5/0009* (2013.01); *B29C 71/00* (2013.01); *C08J 7/00* (2013.01); *B29C 2071/0027* (2013.01); *B29C 2071/0036* (2013.01)

(58) Field of Classification Search
  CPC ..... B29C 2071/0027; B29C 2071/0036; C08F 6/005; C08J 7/00
  See application file for complete search history.

(56) References Cited

U.S. PATENT DOCUMENTS

| | | | | |
|---|---|---|---|---|
| 5,220,796 A | * | 6/1993 | Kearns | B01D 5/0054 62/636 |
| 6,294,054 B1 | * | 9/2001 | Sutter | B01D 3/10 202/176 |
| 8,522,537 B2 | * | 9/2013 | Lee | F01M 5/001 60/298 |
| 2002/0000365 A1 | * | 1/2002 | Wang | B01D 5/0006 202/185.5 |
| 2005/0072155 A1 | * | 4/2005 | Tsutsui | B01D 5/0093 60/670 |
| 2007/0193852 A1 | * | 8/2007 | Ashford | B01D 3/28 196/132 |
| 2007/0281052 A1 | * | 12/2007 | Goodwin | B01D 3/001 426/11 |
| 2009/0038302 A1 | * | 2/2009 | Yamada | F01N 3/0205 60/320 |
| 2010/0236724 A1 | * | 9/2010 | Duesel, Jr. | C02F 1/048 159/4.02 |
| 2015/0047967 A1 | * | 2/2015 | Burton | B01D 1/16 203/49 |
| 2018/0245547 A1 | * | 8/2018 | Hamad | F02M 31/02 |

OTHER PUBLICATIONS

Chapaton et al., U.S. Appl. No. 15/618,550 entitled "Process and System for Reducing Volatile Compound Emissions from a Product," filed Jun. 9, 2017.

* cited by examiner

MOBILE VACUUM DISTILLATION UNIT FOR TRANSPORT OF ARTICLES CONTAINING RELEASABLE VOLATILE ORGANIC COMPOUNDS

INTRODUCTION

Polymers can be found in many different products encountered on a daily basis including, for example, a wide range of plastics, fibers, paints, adhesives, elastomers, rubbers, foams, sealants, and coatings. A polymer is formed by a polymerization reaction in which monomers and/or prepolymers are chemically linked together via reactive functional groups. Oftentimes, an organic solvent, catalyst, or initiator may be used as a polymerization aid. Additionally, a polymer may be combined with an additive, modifier, plasticizer, reinforcing material, or filler to tailor the chemical, mechanical, physical, cosmetic, and/or processing characteristics of the polymer for a given application. Manufactured articles that are comprised in part or entirely from one or more polymers may thus contain releasable volatile organic compounds (VOCs). The releasable VOCs may be bound within the polymer as a byproduct of the manufacturing process or they may be produced within the polymer under certain environmental conditions. Over time, VOC emissions may be released from the manufactured article as VOC vapors. The VOC emissions may be comprised of residual unreacted monomers, formed dimers, oligomers, additives, modifiers, moisture, solvents, residual catalysts, reaction by-products, and/or decomposition products of the polymer itself, to name but a few examples.

SUMMARY OF THE DISCLOSURE

A mobile vacuum distillation unit according to one embodiment of the present disclosure includes a shell, a vacuum distillation vessel, a condensate storage tank, a condenser, and a vacuum pump system. The shell defines an enclosed interior space and is mounted to a transportable support platform. The vacuum distillation vessel is housed within the enclosed interior space of the shell and has a casing that defines a vacuum distillation chamber. The casing also defines an outlet of the vacuum distillation vessel. The condensate storage tank is housed within the enclosed interior space of the shell and has a tank wall that defines an internal cavity. The condenser is housed within the enclosed interior space of the shell and is fluidly coupled to the outlet of the vacuum distillation vessel and to an inlet of the condensate storage tank. The condenser, moreover, is configured to condense volatile organic compound (VOC) vapor emissions received from the vacuum distillation chamber into a liquid condensate and to deliver the liquid condensate into the internal cavity of the condensate storage tank. The vacuum pump system fluidly communicates with the vacuum distillation chamber of the vacuum distillation vessel and is operable to create a partial vacuum within the vacuum distillation chamber and to draw the VOC vapor emissions from the vacuum distillation chamber into the condenser.

The mobile vacuum distillation unit of the aforementioned embodiment may include additional features or be further defined. For example, an outlet of the condensate storage tank may be fluidly coupled to a drain conduit that includes a drain valve. As another example, the condenser may include an inlet header, an outlet header, a housing that defines an internal jacket space, and a plurality of metal tubes that extend through the internal jacket space between the inlet header and the outlet header. Furthermore, the inlet header of the condenser may be fluidly coupled to the outlet of the vacuum distillation vessel. In yet another example, the housing of the condenser may define a coolant inlet and a coolant outlet. The coolant inlet and the coolant outlet may be fluidly coupled by a coolant conduit, and a refrigeration device may fluidly communicate with the coolant conduit as well. In another example, the mobile vacuum distillation unit may comprise one or more heaters for heating the vacuum distillation chamber. In still another example, mobile vacuum distillation unit may comprise an exhaust gas heat exchanger that is configured to circulate a heat transfer fluid through an interior heat transfer passage defined in the casing of the vacuum distillation vessel. The exhaust gas heat exchanger may include an inlet header fluidly coupled to an engine exhaust conduit, an outlet header fluidly coupled to an exhaust pipe, a housing that defines an internal jacket space, and a plurality of metal tubes that extend through the internal jacket space between the inlet header and the outlet header. The housing may also define a heat transfer fluid inlet and a heat transfer fluid outlet. The heat transfer fluid inlet and the heat transfer fluid outlet may be fluidly coupled to the interior heat transfer passage of the casing of the vacuum distillation vessel by a fluid return conduit and a fluid delivery conduit, respectively.

A mobile vacuum distillation unit according to another embodiment of the present disclosure includes a shell, a vacuum distillation vessel, a condensate storage tank, a condenser, a vacuum pump system, and an exhaust gas heat exchanger. The shell defines an enclosed interior space and is being mounted to a transportable support platform that includes a plurality of wheels adapted for road engagement. The vacuum distillation vessel is housed within the enclosed interior space of the shell and has a casing that defines a vacuum distillation chamber. The casing also defines an outlet of the vacuum distillation vessel. The condensate storage tank is housed within the enclosed interior space of the shell and has a tank wall that defines an internal cavity. The condenser is housed within the enclosed interior space of the shell and is fluidly coupled to the outlet of the vacuum distillation vessel and to an inlet of the condensate storage tank. The condenser, moreover, is configured to condense volatile organic compound (VOC) vapor emissions received from the vacuum distillation chamber into a liquid condensate and to deliver the liquid condensate into the internal cavity of the condensate storage tank. The vacuum pump system fluidly communicates with the vacuum distillation chamber of the vacuum distillation vessel and is operable to create a partial vacuum within the vacuum distillation chamber and to draw the VOC vapor emissions from the vacuum distillation chamber into the condenser. The exhaust gas heat exchanger is fluidly coupled to an engine exhaust conduit and, further, is configured to circulate a heat transfer fluid through an interior heat transfer passage defined in the casing of the vacuum distillation vessel.

The mobile vacuum distillation unit of the aforementioned embodiment may include additional features or be further defined. For example, the condenser may include an inlet header, an outlet header, a housing that defines an internal jacket space, and a plurality of metal tubes that extend through the internal jacket space between the inlet header and the outlet header. The inlet header of the condenser may be fluidly coupled to the outlet of the vacuum distillation vessel. Furthermore, the housing of the condenser may define a coolant inlet and a coolant outlet. The coolant inlet and the coolant outlet may be fluidly coupled by a coolant conduit, and a refrigeration device may fluidly communicate with the coolant conduit as well. In another example, the exhaust gas heat exchanger may include an inlet header fluidly coupled to an engine exhaust conduit, an outlet header fluidly coupled to an exhaust pipe, a housing that defines an internal jacket space, and a plurality of metal tubes that extend through the internal jacket space between the inlet header and the outlet header. The housing may define also a heat transfer fluid inlet and a heat transfer fluid outlet. The heat transfer fluid inlet and the heat transfer fluid outlet may be fluidly coupled to the interior heat transfer passage of the casing of the vacuum distillation vessel by a fluid return conduit and a fluid delivery conduit, respectively. In still another example, the vacuum distillation unit may comprise one or more direct heaters configured to directly heat the casing of the vacuum distillation vessel. In yet another example, the vacuum pump system may include a low-vacuum roughing pump and a high-vacuum momentum transfer pump.

A method of extracting volatile organic compound (VOC) vapor emissions from one or more polymer-containing articles that contain releasable VOCs during transportation of the one or more polymer-containing articles between geographically separate destinations is also described in the present disclosure. The method includes several steps. In one step, a mobile a mobile vacuum distillation unit is provided that has a shell. The shell encloses a vacuum distillation vessel, a condenser, and a condensate storage tank, and is mounted to a transportable support platform. In another step, the mobile vacuum distillation unit is transported from one destination to another destination. In yet another step, a partial vacuum is created within a vacuum distillation chamber defined by a casing of the vacuum distillation vessel while the mobile vacuum unit is being transported. The vacuum distillation chamber includes one or more polymer-containing articles that contain releasable volatile organic compounds (VOCs). In still another step, VOC vapor emissions are extracted from the one or more polymer-containing articles within the vacuum distillation chamber of the vacuum distillation vessel while the mobile vacuum unit is being transported. In another step, the VOC vapor emissions are condensed within the condenser, which is fluidly coupled to the vacuum distillation vessel, while the mobile vacuum unit is being transported. The VOC vapor emissions are condensed into a liquid condensate that includes one or more liquid organic compounds. In still another step, the liquid condensate is stored in the condensate storage tank while the mobile vacuum unit is being transported.

The aforementioned method may include additional steps or be further defined. For example, the method may include heating the vacuum distillation chamber to an elevated temperature above ambient temperature while the mobile vacuum unit is being transported. To that end, transporting the vacuum distillation unit may include hauling the transportable support platform onto which the vacuum distillation unit is mounted behind a tractor unit powered by a diesel engine, and heating the vacuum distillation chamber may involve passing exhaust gas produced by the diesel engine through an exhaust gas heat exchanger to transfer heat from the exhaust gas to a heat transfer fluid that is circulating between the exhaust gas heat exchanger and the casing of the vacuum distillation vessel. In another example, the VOC vapor emissions extracted from the one or more polymer-containing articles may include at least one of styrene, formaldehyde, acetaldehyde, benzene, ethyl benzene, toluene, xylene, acrolein, or phthalates. In yet another example, the step of creating the partial vacuum within the vacuum distillation chamber may include operating a vacuum pump system enclosed by the shell of the mobile vacuum distillation unit to reduce an absolute pressure of the vacuum distillation chamber to between 5 mmHg and $1 \times 10^{-7}$ mmHg.

DETAILED DESCRIPTION

The present disclosure relates to a mobile vacuum distillation unit that is able to extract VOC emissions in vapor phase (referred to herein as VOC vapor emissions) from one or more polymer-containing articles that contain releasable VOCs while the article(s) are in transit between two geographical distinct destinations. For example, polymer-containing automobile component parts may be loaded into the mobile vacuum distillation unit for transportation from a shipping destination, such as supplier facility, to a delivery destination, such as an automobile assembly plant. While the polymer-containing article(s) are in transit, the mobile vacuum distillation unit may be operated to extract VOC vapor emissions from the article(s). The VOC vapor emissions may be condensed and stored on board the mobile vacuum distillation unit until such time that the resultant liquid condensate can be emptied from the unit. The mobile vacuum distillation unit can thus combine two operations—VOC extraction and transportation of the polymer-containing article(s)—that have traditionally been performed separately in both time and location. To that end, the use of the mobile vacuum distillation unit may obviate or at least substantially reduce the need to construct and/or operate permanent facilities that house VOC extraction and recovery operations, which in turn can simplify logistics associated with overall manufacturing and assembly operations while providing an economical benefit as well.

Figure 1:
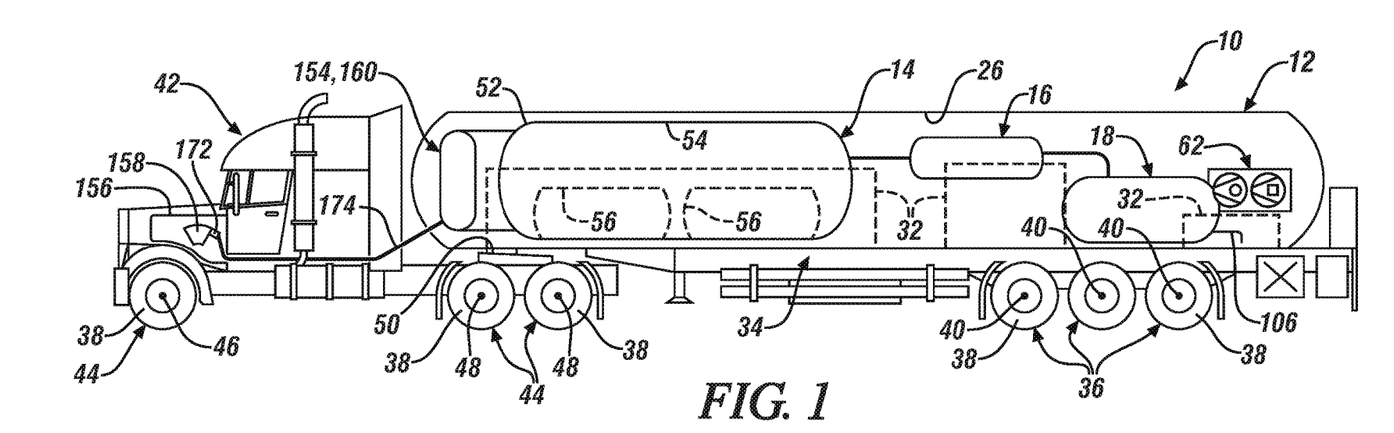
FIG. 1 is a side elevational and partial cross-sectional view of a mobile vacuum distillation unit mounted onto a transportable support platform according to one embodiment of the present disclosure, wherein in this illustration the transportable support platform is a trailer bed that is engageable with a trailer unit.
Figure 2:
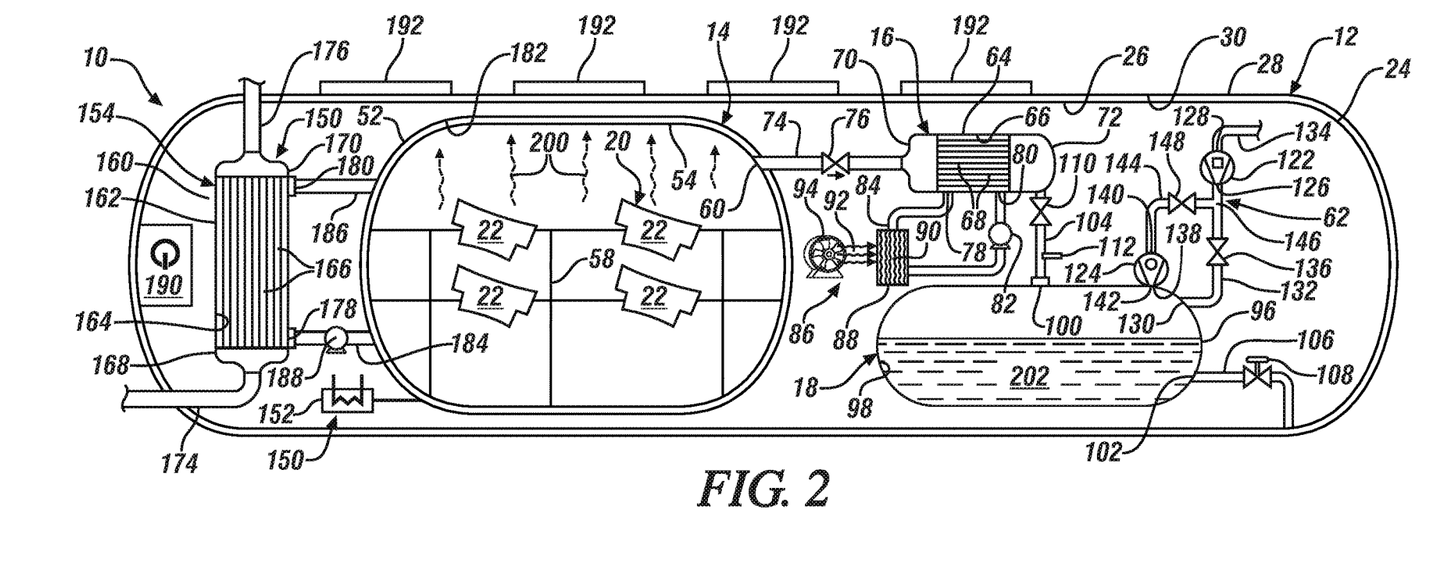
FIG. 2 is cross-sectional view of the mobile vacuum distillation unit separate from the transportable support platform according to one embodiment of the present disclosure.

Referring now to FIGS. 1-2, a mobile vacuum distillation unit 10 is depicted in accordance with an embodiment of the present disclosure. The mobile vacuum distillation unit 10 includes a shell 12 that encloses a vacuum distillation vessel 14, a condenser 16, a condensate storage tank 18, and ancillary equipment that may be used in conjunction with any of the aforementioned components 12, 14, 16, 18 including, for example, pumps, valves, conduits, additional heat exchangers, fans, and power sources, as will be further discussed below. The mobile vacuum distillation unit 10 may be operated to extract VOC vapor emissions 200 from one or more polymer-containing articles 20 (FIG. 2) while, at the same time, the unit 10 is being hauled to transport the article(s) 20 to a delivery destination where the article(s) 20 will be unloaded. In one particular embodiment, the one or more polymer-containing articles 20 may be a plurality of polymer-containing automobile component parts 22 that will ultimately be integrated into a fully-assembled automobile. The VOC vapor emissions 200 extracted from the article(s) 20 may include any organic compound that can be extricated from the article(s) 20 in vapor form, including specific emissions such as: styrene, formaldehyde, acetaldehyde, benzene, ethyl benzene, toluene, xylene, acrolein, and phthalates. Inorganic and/or organo-metallic compounds may also be extracted in the vapor phase along with the VOC vapor emissions 200.

The shell 12 includes a base wall 24 that defines an enclosed interior space 26. Each of the vacuum distillation vessel 14, the condenser 16, and the condensate storage tank 18 is housed within the enclosed interior space 26 along with other ancillary equipment. Additionally, as shown, the shell 12 may include a supplemental wall 28 that surrounds and is displaced from the base wall 24 to thereby define a gap 30 between the two walls 24, 28. The gap 30 may be filled with a temperature-regulating substance that helps maintain a controlled temperature within the enclosed interior space 26 despite the wide range of environmental conditions that may exist outside of the shell 12 at any given time. For example, the temperature-regulating substance may be (1) a gas such as air or nitrogen, (2) a liquid such as a mixture of water and ethylene glycol, propylene glycol, or ethylene glycol and propylene glycol, or (3) a solid insulator such as fiberglass, cellulose, or polyurethane foam. The base wall 24 and the supplemental wall 28 (if present) may be constructed from any of a number of materials including stainless steel or high-density polyethylene (HDPE). Portions 32 of the shell 12 may be openable to permit access to the enclosed interior space 26.

The shell 12 may be mounted to a transportable support platform 34 that includes a plurality of wheels 36. The wheels 36 facilitate mobility of the vacuum distillation unit 10. In one implementation, as shown here, the transportable support platform 34 may be a trailer bed in which the plurality of wheels 36 is a plurality of trailer wheels having rim-supported rubber tires 38 for road engagement. The trailer wheels are mounted on rotatable dead axles 40. The trailer bed may be connectable to a diesel-powered tractor unit 42 that includes a plurality of wheels 44 that also have rim-supported rubber tires 38. The wheels 44 on the tractor unit 42 are mounted on at least one rotatable drive axle 46 and at least one rotatable steering axle 48. A fifth wheel coupling 50 or some other mechanical connection feature included on the tractor unit 42 is engageable with the trailer bed to connect the tractor unit 42 and the trailer bed together. To that end, the mobile vacuum distillation unit 10 may be carried on the trailer bed and hauled by the tractor unit 42 along an interconnected road system from one destination to another in much the same way that tanker trucks haul their cargo. Alternatively, in another implementation, the transportable support platform 34 may be a railway car platform that includes a plurality of rail wheels configured to engage and be pulled along rail tracks of a railway system.

The vacuum distillation vessel 14 includes a casing 52 that defines a contained distillation chamber 54. The distillation chamber 54 is accessible through one or more access doors 56 (FIG. 1) that is positioned behind and overlaps with the openable portions 32 of the shell 12 to allow for easy loading and unloading of the polymer-containing article(s) 20 to and from the chamber 54 through the shell 12. Located within the distillation chamber 54 may be one or more support structures 58 such as shelves and/or racks for securing the one or more polymer-containing articles 20. The support structure(s) 58 are particularly useful if a large number of articles 20 are to be loaded into the vacuum distillation vessel 14 and transported together as is illustrated here in FIG. 2 with the polymer-containing automobile component parts 22. The casing 52 of the vacuum distillation vessel 14 defines an outlet 60 of the vessel 14 through which the pressure of the distillation chamber 54 can be reduced to a partial vacuum (i.e., absolute pressure below 760 mmHg) and through which the VOC vapor emissions 200 released into the distillation chamber 54 from the article(s) 20 may be evacuated from the vessel 14. The partial vacuum may be created within the distillation chamber 54 by a vacuum pump system 62 as described in more detail below.

The condenser 16 is preferably a jacketed condenser that includes a housing 64, which defines an internal jacket space 66, and a plurality of metal tubes 68 that extend through the internal jacket space 66 between an inlet header 70 and an outlet header 72. Each of the inlet header 70 and the outlet header 72 is sealed from the internal jacket space 66 by a tubesheet. The metal tubes 68 may make a single pass through the internal jacket space 66, in which case the inlet header 70 and the outlet header 72 are on opposite sides of the condenser 16, or they may make multiple passes through the internal jacket space 66, in which case the inlet header 70 and the outlet header 72 may be on the same side or opposite sides of the condenser 16. The inlet header 70 is fluidly coupled to the outlet 60 of the vacuum distillation vessel 14 through a condenser inlet conduit 74 that may include a one-way check valve 76. Additionally, each of a coolant inlet 78 and a coolant outlet 80 is defined in the housing 64 and fluidly communicates with the internal jacket space 66.

The inlet header 70 of the condenser 16 receives released the VOC vapor emissions 200 from the distillation chamber 54 and directs those emissions through the metal tubes 68. The released VOC vapor emissions 200 are drawn into and through the plurality of metal tubes 68 by the vacuum pump system 62. At the same time, a liquid coolant may flow through the internal jacket space 66 to condense the VOC vapor emissions 200 passing through the metal tubes 68 into a liquid phase. The liquid coolant may be any heat transfer liquid such as water, a mixture of water and ethylene glycol, a mixture of water and propylene glycol, or a mixture of water, ethylene glycol, and propylene glycol. The liquid coolant may be circulated by a coolant pump 82 from the coolant outlet 80 back to the coolant inlet 78 through a coolant conduit 84 that fluidly couples the inlet 78 and the outlet 80. A refrigeration device 86 may fluidly communicate with the coolant conduit 84 to remove heat from the liquid coolant as it recirculates back to the coolant inlet 78. The refrigeration device 86 may be a radiator 88 that has a plurality of finned-tubes 90—through which the liquid coolant flows—in external heat transfer communication with an air stream 92 provided by a fan 94.

Figure 3:
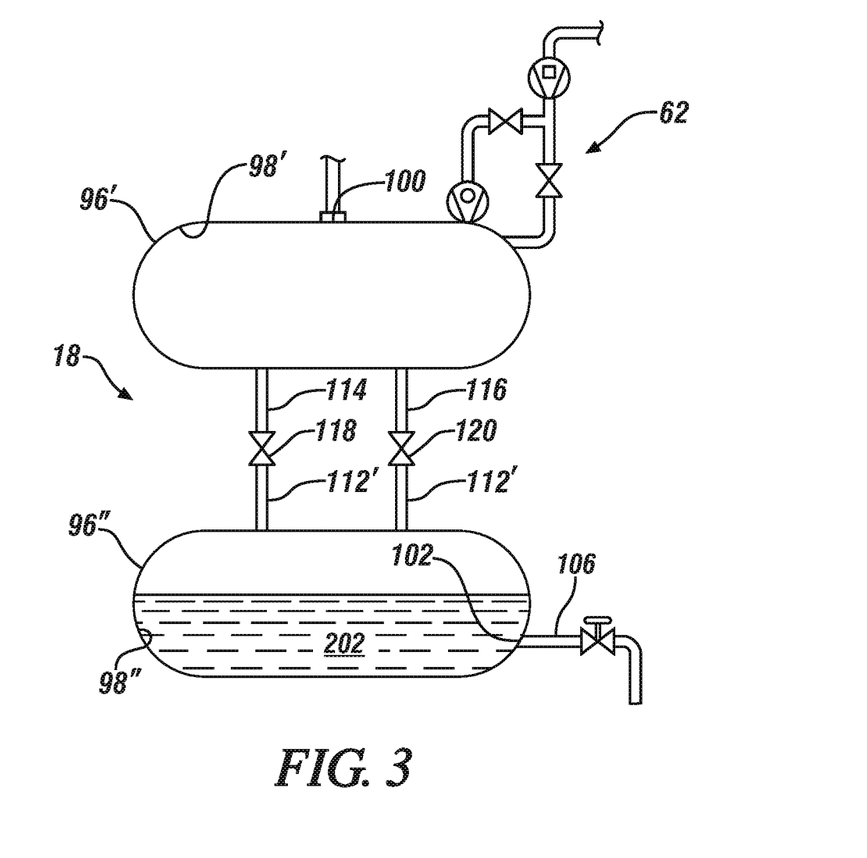
FIG. 3 is an elevated cross-sectional view of a condensate storage tank of the mobile vacuum distillation unit according to an alternative embodiment of the present disclosure.

The condensate storage tank 18 includes a tank wall 96 that defines an internal cavity 98 for holding a liquid condensate 202 that exits the condenser 16. The tank wall 96 defines an inlet 100 to the internal cavity 98 and an outlet 102 from the internal cavity 98. The inlet 100 is fluidly coupled to the outlet header 72 of the condenser 16 through a condenser outlet conduit 104. The outlet 102 is fluidly coupled to a drain conduit 106 that includes a drain valve 108. The drain valve 108 may be actuated to control the flow of the liquid condensate 202 out of the condensate storage tank 18 through the drain conduit 106 under hydrostatic pressure. And, to ensure the condensate storage tank 18 is properly isolated when drained, an isolation valve 110 and an air break 112 may be included in the condenser outlet conduit 104, with the air break 112 being positioned between the isolation valve 110 and the inlet 100 of the storage tank 18. In an alternative implementation, as shown in FIG. 3, the condensate storage tank 18 may include an upper tank wall 96' defining an upper internal cavity 98' and a lower tank wall 96" defining a lower internal cavity 98". The upper tank wall 96' defines the inlet 100 of the condensate storage tank 18 and the lower tank wall 96" defines the outlet 102. The upper tank wall 96' and the lower tank wall 96" are connected by a first connection conduit 114 and a second connection conduit 116. Each of the first and second connection conduits 114, 116 includes an isolation valve 118, 120 and, additionally, one or both of the connection conduits 114, 116 includes an air break 112' 122 downstream of the valve 114, 116.

As indicated above, the vacuum pump system 62 is included in the mobile vacuum distillation unit 10 and is configured to have two primary functions: (1) to create the partial vacuum within the distillation chamber 54 and (2) to draw the VOC vapor emissions 200 out of the distillation chamber 54 and through the condenser 16. The vacuum pump system 62 is operable to create a partial vacuum in the distillation chamber 54 having an absolute pressure as low as $1 \times 10^{-7}$ mmHg. The vacuum pump system 62 may be contained within the interior space 26 of the shell 12 and includes at least one vacuum pump. Preferably, in this particular embodiment, and as shown here in FIG. 2, the vacuum pump system 62 includes a low-vacuum roughing pump 122 and a high-vacuum momentum transfer pump 124. The low-vacuum roughing pump 122 may be a two-stage rotary vane pump and the high-vacuum momentum transfer pump 124 may be a turbomolecular pump with or without a Holweck drag stage downstream of a turbomolecular stage. Both pumps 122, 124 are in fluid communication with the outlet 60 of the vacuum distillation vessel 14, and thus the vacuum distillation chamber 54, and their operation can achieve a wide range of subatmospheric pressures when creating the partial vacuum within the distillation chamber 54 as needed.

In the specific embodiment of the vacuum pump system 62 depicted here, the low-vacuum roughing pump 122 includes an inlet 126 and an outlet 128. The inlet 126 of the pump 122 is fluidly coupled to a first vacuum port 130 defined in the tank wall 96 of the condensate storage tank 18 by a roughing conduit 132, and the outlet 128 is fluidly coupled to an exhaust conduit 134. The roughing conduit 132 includes a roughing valve 136 upstream of the low-vacuum roughing pump 122. Regarding the high-vacuum momentum transfer pump 124, it too includes an inlet 138 and an outlet 140. The inlet 138 of the pump 124 is mounted to a second vacuum port 142 defined in the tank wall 96 of the condensate storage tank 18, and the outlet 140 is fluidly coupled to the roughing conduit 132 by a foreline conduit 144. The foreline conduit 144 merges with the roughing conduit 132 at a conduit junction 146 positioned between the roughing valve 136 and the low-vacuum roughing pump 122. A foreline valve 148 is included in the foreline conduit 144 upstream of the conduit junction 146. As shown here in FIG. 2, the first and second vacuum ports 130, 142 are located to access a head space of the condensate storage tank 18 and, consequently, enable the vacuum pump system 62 to fluidly communicate with the vacuum distillation chamber 54 through the condenser 16.

Other designs and pump arrangements that have the same operational capability can be implemented in the vacuum pump system 62 besides the embodiment shown here. For example, while only one high-vacuum momentum transfer pump 124 is shown here in FIG. 2, the vacuum pump system 62 may include multiple serially arranged high-vacuum momentum transfer pumps 124 mounted to the second vacuum port 142. As another example, the low-vacuum roughing pump 122 may be located downstream of the high-vacuum momentum transfer pump 124 in the same conduit along with a turbo pump or a drag pump positioned between the two vacuum pumps 122, 124 to assist operating the low-vacuum roughing pump 122 through the high-vacuum momentum transfer pump 124. And, in yet another example, the vacuum pump system 62 may be fluidly coupled to the outlet header 72 of the condenser 16 instead of the tank wall 96 of the condensate storage tank 18. A variety of other designs of the vacuum pump system 62 that are not mentioned yet would be appreciated by those skilled in the art may also be employed.

The mobile vacuum distillation unit 10 may further include one or more heaters 150 for supplying heat to the vacuum distillation vessel 14 and heating the vacuum distillation chamber 54. In conjunction with the reduced pressure of the vacuum distillation chamber 54, the ability to heat the vacuum distillation chamber 54 may help extract the VOC vapor emissions 200 from the polymer-containing article(s) 20 contained therein, especially for certain releasable VOCs that have a relatively low vapor pressure and, thus, a relatively high boiling point at standard temperature and pressure (STP, 20° C. and 760 mmHg absolute). The one or more heaters 150 are able to heat the vacuum distillation chamber 54 up to 325° C. and, typically, to a temperature between 40° C. and 275° C. as needed. The one or more heaters 150 may include one or more direct heaters 152 that directly heat the casing 52 of the vacuum distillation vessel 14. Examples of a suitable direct heater include an electrical heater, a thermoelectric generator that uses the Peltier effect to produce heat when exposed to a DC current, and an induction heater. Each of those types of direct heaters may be easily carried within the shell 12 of the mobile vacuum distillation unit 10. Other types of direct heaters not specifically mentioned here are of course permitted provided that they can be carried by the mobile vacuum distillation unit 10.

The one or more heaters 150 may also include an indirect heater 154 that indirectly heats the casing 52 of the vacuum distillation vessel 14. For example, in the embodiment shown here, in which the mobile vacuum distillation unit 10 is hauled behind the tractor unit 42, the indirect heater 154 may reclaim heat from a powertrain 156 (FIG. 1) of the tractor unit 42 and deliver that heat to the casing 52 by way of a heat-transfer fluid. Specifically, the powertrain 156 of the tractor unit 42 may include a diesel engine 158 that produces a hot exhaust gas when internally combusting diesel fuel. The hot exhaust gas, which may have a temperature ranging from 40° C. to 600° C. as it exits the diesel engine 158, may be routed through an exhaust gas heat exchanger 160 contained within the enclosed interior space 26 of the shell 12 near the vacuum distillation vessel 14. At the same time, a heat-transfer fluid may also be routed through the exhaust gas heat exchanger 160 to accumulate heat from the hot exhaust gas. The heat transfer fluid may then be circulated to the casing 52 of the vacuum distillation vessel 14, where it heats the vacuum distillation chamber 54, and then returned to the exhaust gas heat exchanger 160. The heat transfer fluid employed here may be water, a mixture of water and ethylene glycol, a mixture of water and propylene glycol, or a mixture of water, ethylene glycol, and propylene glycol.

The exhaust gas heat exchanger 160 preferably includes a housing 162, which defines an internal jacket space 164, and a plurality of metal tubes 166 that extend through the internal jacket space 164 between an inlet header 168 and an outlet header 170. Each of the inlet header 168 and the outlet header 170 is sealed from the internal jacket space 164 by a tubesheet. The metal tubes 166 may make a single pass or multiple passes through the internal jacket space 164 similar to that of the condenser 16 discussed above. The inlet header 168 is fluidly coupled with an exhaust manifold 172 of the diesel engine 158 through an engine exhaust conduit 174, and the outlet header 170 is fluidly coupled with an exhaust pipe 176 that discharges exhaust gas outside of the shell 12 to the surrounding atmosphere. Additionally, a heat transfer fluid inlet 178 and a heat transfer fluid outlet 180 are defined in the housing 162. Each of the heat transfer fluid inlet 178 and the heat transfer fluid outlet 180 is fluidly coupled to an interior heat transfer passage 182 defined in the casing 52 of the vacuum distillation vessel 14 by way of a fluid return conduit 184 and a fluid delivery conduit 186, respectively. In that regard, the heat transfer fluid can flow from internal jacket space 164 of the exhaust gas heat exchanger 160 and into the heat transfer passage 182 of the casing 52 of the vacuum distillation vessel 14 through the delivery conduit 186, and then flow out of the heat transfer passage 182 and back into the internal jacket space 164 through the fluid return conduit 184. The circulation of the heat transfer fluid can be driven by a heat transfer fluid pump 188.

The mobile vacuum distillation unit 10 includes at least one power source 190 to power the various components of the unit 10. For instance, at least each of the following components may need some form of electrical power to function: the coolant pump 82 and the refrigeration device (e.g., the fan 94 for the radiator 88) associated with the condenser 16, the vacuum pump system 62 (e.g., the low-vacuum roughing pump 122 and the high-vacuum momentum transfer pump 124), and the one or more heaters 150 (e.g., the electrical, thermoelectrical generator, or induction heater and/or the heat transfer fluid pump 188 associated with the exhaust gas heat exchanger 1601. The power source(s) 190 may include an internal combustion motor, a fuel cell, a battery pack, or some other power source that may or may not be carried on-board the mobile vacuum distillation unit 10. Power may even be diverted from the diesel engine 158 that powers the tractor unit 42 in those embodiments in which the mobile vacuum distillation unit 10 is hauled behind the tractor unit 42. Still further, as shown here in FIG. 2, a solar panel 192 or an array of solar panels 192 may be attached externally to the shell 12 of the mobile vacuum distillation unit 12 and oriented to absorb sunlight. The sunlight is converted into electrical current that can be passed through an inverter and then used directly by any of the various components of the unit 10 or stored in a battery pack for use at a later time.

The mobile vacuum distillation unit 10 also includes a standard control architecture to operate and control the mobile vacuum distillation unit 10 using manual commands or a programmed operating procedure. The control architecture includes various types of sensors to measure parameters such as pressure, temperature, flow rate, and concentration at one or more locations throughout the unit 10. The sensors provide their measurement data to one or more controllers continuously or at some other regular or irregular schedule. The controller(s), in turn, respond to manual commands or execute programmed instructions based on the data provided by the sensors to operate valves (including valves 108, 110, 118, 120, 136, 148) and other components (including components 82, 86, 112, 112', 62 150, 188, 190) in order to achieve certain objectives or performance outcomes of the unit 10 with regards to the extraction, collection, and storage of the released VOC vapor emissions 200. Many different feasible control architectures for operating and controlling the mobile vacuum distillation unit 10 are known or readily devisable by those skilled in the art are and, accordingly, such control features are not shown here or described in any greater detail.

The mobile vacuum distillation unit 10 may be operated whenever desired and has the flexibility of being operated at any time and at any location. To begin, the one or more polymer-containing articles 20 may be loaded into the vacuum distillation chamber 54 of the vacuum distillation vessel 14. This may involve opening the openable portions 32 of the shell 12 and the inwardly-disposed yet overlapping access door(s) 56 of casing 52 of the vacuum distillation vessel 14 to gain access to the vacuum distillation chamber 54. The polymer-containing article(s) 20 may then be positioned inside the vacuum distillation chamber 54 and secured in place for transit. In the embodiment shown here, the polymer-containing article(s) 20 are a plurality of polymer-containing automobile component parts 22 that are supported on the support structures 58. The polymer-containing automobile component parts 22 may include any component part of a larger vehicle assembly including hoods, side panels, floor panels, rear decks, and any other parts that may be positioned to release VOC emissions in various phases into a passenger compartment of an automobile.

The polymer-containing article(s) 20 (e.g., the plurality of polymer-containing automobile component parts 22) may be formed entirely from one or more polymers or they may be formed from a combination of one or more polymers and one or more non-polymer materials. For example, the polymer-containing article(s) 20 may be constructed from a fiber-reinforced thermoset polymer, such sheet molding compound (SMC), polystyrene, acrylonitrile butadiene styrene (ABS), polyvinyl chloride (PVC), or polyurethane, to name but a few examples. These materials may be formed into their final geometry by compression molding, injection molding, thermoforming, etc. As another example, an adhesive or sealant that is integrated with the polymer-containing article(s) 20 may be formulated from a polymer. In each of the examples listed above, plus others not listed, releasable VOCs may be bound or otherwise incorporated into the polymer-containing article(s) 20 even after the polymer has been fully processed through polymerization and, if applicable, curing.

Without intending to be bound by theory, it is believed that the presence of releasable VOCs within the polymer-containing article(s) 20 may be attributed to the precursor compositions used to make the polymer components of those article(s) 20. For example, some polymers are intentionally formed from polymer precursor compositions that include a stoichiometric excess of one or more liquid reactant monomers or pre-polymers. In addition, certain polymer precursor compositions may include liquid additives or modifiers—notably, organic solvents and/or plasticizers—that do not participate in the polymerization reaction but are nonetheless added for the purpose of adjusting the rheological or thixotropic properties of the precursor compositions. Because these precursor compositions may contain one or more liquid components that are not consumed or otherwise removed during polymerization, the resulting polymers may contain residual liquid organic components, which may evolve from the polymers as VOC vapor emissions under certain temperature and pressure conditions, even after polymerization is complete. The VOC vapor emissions that may be released from the polymer constituency of the polymer-containing article(s) 20 may include unreacted monomers, residual catalysts or initiators, plasticizers, solvents, formed dimers, oligomers, additives, modifiers, moisture, reaction by-products, and/or decomposition products of the polymer itself.

Some examples of unreacted monomers that may be present in polymers include alcohols, aldehydes, alkenes, amides, amines, anhydrides, aromatic hydrocarbons, carboxylic acids, dienes, esters, ethers, imines, isocyanates, ketones, nitriles, and phenols. Some examples of residual catalysts or initiators that may be present in the polymers include organo-metallic compounds, free-radical initiators, and ionic initiators. Some examples of residual plasticizers that may be present in the polymers include adipates, azelates, benzoates, epoxy, esters, mellitates, trimellitates, phosphates, phthalates, polybutene, sebacates, sulfonamides, terephthalates, and orthophthalates. Some specific examples of plasticizers include: 2,2,4-trimethyl-1,3-pentanediol diisobutyrate (TXIB) and tris-decyl benzene-1,2,4-tricarboxylate or tridecyl trimellitate (TDTM). Some examples of residual organic solvents that may be present in the polymers include alcohols, acetates, saturated, unsaturated, and aromatic hydrocarbons, ethers, and esters, with some specific examples including saturated hydrocarbons such as butane, pentane, hexane, heptane, octane, nonane, decane, pentadecane, and hexadecane; unsaturated hydrocarbons such as butene, isobutylene, 1,3-butadiene, propene, ethylene, and pentene; aromatic hydrocarbons such as benzene, toluene, xylene, styrene, naphthalene, biphenyl, and phenol; halogenated hydrocarbons; formic acid; and methanol.

Some of the more notable constituents of the VOC vapor emissions 200 that may be released from the polymer-containing article(s) 20—and in particular from polymer-containing automobile component parts 22 fabricated from SMC, ABS, and polystyrene—include styrene, formaldehyde, acetaldehyde, benzene, ethyl benzene, toluene, xylene, acrolein, and/or phthalates. These and other releasable VOCs that may contained within the polymer-containing article(s) 20 may exhibit a wide range of vapor pressures at a given pressure and temperature. The vapor pressure of a given VOC at a particular temperature and pressure can determined experimentally, by the Clausius-Clapeyron equation, or by published reference data. This vapor pressure information is useful in that allows for the pressure and temperature operating parameters of the vacuum distillation vessel 14 to be optimally selected. Nonetheless, to help ensure that the VOC vapor emissions 200 are released from the polymer-containing article(s) 20 within the vacuum distillation vessel 14 at an appreciable rate, the partial vacuum created within the vacuum distillation chamber 54 that contains the polymer-containing article(s) 20 preferably has an absolute pressure that ranges from $1\times10^{-7}$ mmHg to 5 mmHg, from $1\times10^{-5}$ mmHg to 1 mmHg, or from $1\times10^{-4}$ mmHg to 0.1 mmHg. And if the partial vacuum is not sufficient to extract the VOC vapor emissions 200 at a satisfactory rate, the vacuum distillation chamber 54 may be heated to an elevated temperature, which is above ambient temperature, that may range between 50° C. and 300° C., between 100° C. and 200° C., or between 125° C. and 175° C.

Once the polymer-containing article(s) 20 are loaded into the vacuum distillation vessel 14 and the access door(s) 56 and openable portions 32 of the shell 12 are closed, the mobile vacuum distillation unit 10 is ready for transit. When the vacuum distillation unit 10 is being transported—whether being hauled on the trailer bed by the tractor unit 42, being pulled on the on a rail car along rail tracks, or some other mode of transportation—the VOC vapor emissions 200 may be extracted from the polymer-containing article(s) 20, condensed, and stored. To extract the VOC vapor emissions 200, a partial vacuum is created within the vacuum distillation chamber 54 that encloses the polymer-containing article(s) 20 and, if desired, the vacuum distillation chamber 54 is heated to an elevated temperature above ambient temperature to further assist with VOC vapor phase extraction. The partial vacuum and/or the elevated temperature established within the vacuum distillation chamber 54 increases the rate at which the VOC vapor emissions 200 are emitted from the polymer-containing article(s) 20 relative to standard temperature and pressure (STP, 20° C. and 760 mmHg absolute) and may be initiated and controlled either through manual commands, automated commands according to a programmed control strategy, or by some combination of manual and automated commands.

The partial vacuum is created within the vacuum distillation chamber 54 by the vacuum pump system 62. This may involve, first, operating the low-vacuum roughing pump 122 with the roughing valve 136 open and the foreline valve 148 closed to evacuate the gas atmosphere from the vacuum distillation chamber 54 and ultimately through the roughing conduit 132 and out of the exhaust conduit 134. The low-vacuum roughing pump 122 establishes a partial vacuum within the distillation chamber 54 that, typically, has an absolute pressure ranging from 1 mmHg to 750 mmHg. Once the partial vacuum has been achieved by the low-vacuum roughing pump 122, and if a further reduction in pressure is desired, the high-vacuum momentum transfer pump 124 is operated along with the low-vacuum roughing pump 122 with the foreline valve 148 open and the roughing pump 136 closed. This effectively coverts the low-vacuum roughing pump 122 into a backing pump that supports the operation of the high-vacuum momentum transfer pump 124. The operation of the two pumps 122, 124 together evacuates more of the gas atmosphere from the vacuum distillation chamber 54, although now the gas atmosphere is evacuated through the foreline conduit 144 past the roughing valve 136 and ultimately out of the exhaust conduit 134. The high-vacuum momentum transfer pump 124 and the low-vacuum roughing pump 122 can establish a partial vacuum within the vacuum distillation chamber 54 that has an absolute pressure ranging from $1\times10^{-7}$ mmHg to 1 mmHg.

The vacuum distillation chamber 54 may be heated to an elevated temperature above ambient temperature by operation of the one or more heaters 150. This can be done in a variety of ways. In the embodiment shown here, in which the mobile vacuum distillation unit 10 is being hauled behind a tractor unit 42, the exhaust gas heat exchanger 160 may be operated to heat the vacuum distillation chamber 54. Specifically, the hot exhaust gas produced by the diesel engine 158 is directed into the engine exhaust conduit 174 form the exhaust manifold 172, through the plurality of metal tubes 166 from the inlet header 168 to the outlet header 170 of the exhaust gas heat exchanger 160, and out of the exhaust pipe 176. At the same time, the heat transfer fluid is passed through the internal jacket space 164 of the housing 162 from the heat transfer fluid inlet 178 to the heat transfer fluid outlet 180, through the fluid delivery conduit 186 and into the interior heat transfer passage 182 of the casing 52 of the vacuum distillation vessel 14. The heat transfer fluid heats the vacuum distillation chamber 54 and then flows out of the interior heat transfer passage 182 into the fluid return conduit 184 and, eventually, back to the heat transfer fluid inlet 178 of the housing 162 of the exhaust gas heat exchanger 160. The heat transfer fluid thus circulates between the exhaust gas heat exchanger 160 and the casing 52 of the vacuum distillation vessel 14 to heat the vacuum distillation chamber 54.

The vacuum distillation chamber 54 may also be heated by the one or more direct heaters 152 in lieu of, or in conjunction with, the exhaust gas heat exchanger 160. The one or more direct heaters 152 may be operated during the initial heating of the vacuum distillation chamber 54 along with the exhaust gas heat exchanger 160 to help expedite the overall heating process. The one or more direct heaters 152 may then be shut-down once the vacuum distillation chamber 54 has been heated to the elevated temperature or once the vacuum distillation chamber 54 has been heated up to a certain percentage of the elevated temperature, thereby allowing the exhaust gas heat exchanger 160 finish heating the vacuum distillation chamber 54 and/or to maintain the elevated temperature once it has been attained. Alternatively, and especially in those embodiments where an exhaust gas heat exchanger 160 is not present on-board the vacuum distillation unit 10, the one or more direct heaters may be charged with heating the vacuum distillation chamber 54 up to the elevated temperature. Of course, in some embodiments, the one or more direct heaters 152 may be maintained in a back-up capacity to be operated only in the event that another heater, such as the exhaust gas heat exchanger 160, experiences a failure or unexpected performance decline while the mobile vacuum distillation unit 10 is in transit.

The partial vacuum and optional elevated temperature attained in the vacuum distillation chamber 54 extracts the VOC vapor emissions 200 from the polymer-containing article(s) 20 and introduces them into the distillation chamber 54. The VOC vapor emissions 200 are drawn through the outlet 60 of the vacuum distillation vessel 14 and into the inlet header 70 of the condenser 16 through the condenser inlet conduit 74. From there, the VOC vapor emissions 200 flow through the metal tubes 68 while, simultaneously, a liquid coolant is passed through the internal jacket space 66 defined by the housing 64 of the condenser 16 from the coolant inlet 78 to the coolant outlet 80 and around the metal tubes 68. The liquid coolant in the internal jacket space 66 removes heat from the VOC vapor emissions 200 and condenses some or all of those emissions into the liquid condensate 202. The liquid condensate 202 then enters the outlet header 72 of the condenser 16 and is directed to the internal cavity 98 of the condensate storage tank 18 through the condenser outlet conduit 104. The liquid condensate 202 accumulates and is held in the internal cavity 98 of the condensate storage tank 18. The composition of the liquid condensate 202 within the condensate storage tank 18 may include a single organic liquid compound or a mixture of several organic liquid compounds depending on the number and chemical identify of the VOC vapor emissions 200 extracted from the polymer-containing article(s) 20 over time. The liquid condensate 202 is composed primarily of the liquid organic compounds obtained from the VOC vapor emissions 200—usually at least 90 wt % or even at least 95 wt %—and in some instances may include a small amount of liquid inorganic and/or organo-metallic compounds such as byproducts of photoreacted perfluorinated diphenyl titanocene (a photoinitiator).

The VOC vapor emissions 200 derived from the releasable VOCs contained in the polymer-containing article(s) 20 are extracted, condensed, and ultimately stored as the liquid condensate 202 in the condensate storage tank 18 for as long as needed to effectively reduce the quantity of releasable VOCs in the article(s) 20. Preferably, over time, the concentration of releasable VOCs in the polymer-containing article(s) 20 is reduced to the extent needed to meet Vehicle Interior Air Quality (VIAQ), total vehicle emissions, and other emissions goals. Some or all of the VOC vapor emissions 200 may be extracted from the polymer-containing article(s) 20 while the mobile vacuum distillation unit 10 is being transported from the shipping destination to the delivery destination. Indeed, in some instances, and depending on the travel time needed to move between destinations and the identity of the releasable VOCs contained in the article(s) 20, enough VOC vapor emissions can be extracted from the article(s) 20 during the time the mobile vacuum distillation unit 10 is in transit to meet low emissions targets. In that regard, the polymer-containing article(s) 20 may not have to be subjected to any additional VOC-removal procedures beyond that which is provided by the mobile vacuum distillation unit 10 during transport of the article(s) 20 between destinations.

The polymer-containing article(s) 20 are unloaded from the vacuum distillation chamber 54 of the vacuum distillation vessel 14 once the mobile vacuum distillation unit 10 has arrived at its delivery destination. Before unloading the polymer-containing article(s) 20, however, the operation of the vacuum pump system 62 and the one or more heaters 150 are shut down to eliminate the partial vacuum in the vacuum distillation chamber 54 and, if applicable, decrease the temperature of the chamber 54. As a result of the operation of the mobile vacuum distillation unit 10, the concentration of releasable VOCs present within the polymer-containing article(s) 20 is lower when the article(s) 20 are unloaded from the vacuum distillation vessel 14 compared to when the article(s) 20 were loaded into the vessel 14, as is evidenced by the increase in volume of the liquid condensate 202 in the condensate storage tank 18. The liquid condensate 202 accumulated as a result of extracting and condensing the VOC vapor emissions 200 (plus possibly a small amount of inorganic and/or organo-metallic compound vapors) may now be emptied. The condensate storage tank 18 may be emptied at a waste facility, recycling facility, or in some instances the mobile vacuum distillation unit 10 may be transported back to the shipping destination and the storage tank 18 may be emptied at that location so that the organic liquid compounds can be disposed of, reused, or sold.

The liquid condensate 202 may be emptied from the condensate storage tank 18 by opening the drain valve 108 and allowing the liquid condensate 202 to flow out of the tank 18 through the drain conduit 106. Prior to opening the drain valve 108, and referring specifically to the embodiment shown in FIG. 2, the condensate storage tank 18 may be isolated by closing the isolation valve 110 in the condenser outlet conduit 104, closing the roughing and the foreline valves 136, 148 in the roughing and foreline conduit 132, 144, and opening the air break 112 in the condenser outlet conduit 104. This isolates the internal cavity 98 of the condensate storage tank 18 and equalizes the pressure within the cavity 98 with atmospheric pressure. The drain valve 108 may then be opened to allow the liquid condensate 202 to flow through the outlet 102 of the condensate storage tank 18 and out of the drain conduit 106. The liquid condensate 202 may flow into a collection receptacle or it may flow into a hose or other contained passageway that is connected to an end of the drain conduit 106. A similar process may be employed in the embodiment of the condensate storage tank 18 shown in FIG. 3 to empty the tank 18. Specifically, the isolation valves 118, 120 in the first and second connection conduits 114, 116 are each closed and the air break 112' is opened to isolate the lower internal cavity 98" of the lower tank wall 96" and to equalize the pressure therein with atmospheric pressure. The drain valve 108 may then be opened.

The presently-disclosed mobile vacuum distillation unit 10 is thus a practical and flexible device that allows for VOC vapor emissions vapors 200 to be extracted from the polymer-containing article(s) 20 while the article(s) 20 are otherwise stowed during transportation between geographically separate destinations. The mobile vacuum distillation unit 10 delivers low-emission polymer-containing article(s) 20 while avoiding the time, expense, and dedicated facility space that would need to be invested in a physically permanent VOC treatment structure to achieve the same low-emission article(s). A number of variations of the basic concepts and features described above in the certain disclosed embodiments can certainly be implemented. Accordingly, the above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A mobile vacuum distillation unit comprising:
   a transportable support platform;
   a shell that defines an enclosed interior space, the shell being mounted to the transportable support platform;
   a vacuum distillation vessel housed within the enclosed interior space of the shell, the vacuum distillation vessel having a casing that defines a vacuum distillation chamber, the casing also defining an outlet of the vacuum distillation vessel, wherein polymer-containing articles that contain releasable volatile organic compounds are housed within the vacuum distillation chamber of the vacuum distillation vessel;
   a condensate storage tank housed within the enclosed interior space of the shell, the condensate storage tank having a tank wall that defines an internal cavity;
   a condenser housed within the enclosed interior space of the shell, the condenser being fluidly coupled to the outlet of the vacuum distillation vessel and to an inlet of the condensate storage tank and being configured to condense volatile organic compound (VOC) vapor emissions received from the vacuum distillation chamber into a liquid condensate and to deliver the liquid condensate into the internal cavity of the condensate storage tank; and
   a vacuum pump system in fluid communication with the vacuum distillation chamber of the vacuum distillation vessel, the vacuum pump system being operable to create a partial vacuum within the vacuum distillation chamber and to draw the VOC vapor emissions from the vacuum distillation chamber into the condenser.

2. The mobile vacuum distillation unit set forth in claim 1, wherein an outlet of the condensate storage tank is fluidly coupled to a drain conduit that includes a drain valve.

3. The mobile vacuum distillation unit set forth in claim 1, wherein the condenser includes an inlet header, an outlet header, a housing that defines an internal jacket space, and a plurality of metal tubes that extend through the internal jacket space between the inlet header and the outlet header, and wherein the inlet header of the condenser is fluidly coupled to the outlet of the vacuum distillation vessel.

4. The mobile vacuum distillation unit set forth in claim 3, wherein the housing of the condenser defines a coolant inlet and a coolant outlet, the coolant inlet and the coolant outlet being fluidly coupled by a coolant conduit, and wherein a refrigeration device fluidly communicates with the coolant conduit.

5. The mobile vacuum distillation unit set forth in claim 1, further comprising one or more heaters for heating the vacuum distillation chamber.

6. The mobile vacuum distillation unit set forth in claim 1, further comprising an exhaust gas heat exchanger, the exhaust gas heat exchanger being configured to circulate a heat transfer fluid through an interior heat transfer passage defined in the casing of the vacuum distillation vessel.

7. The mobile vacuum distillation unit set forth in claim 6, wherein the exhaust gas heat exchanger includes an inlet header fluidly coupled to the engine exhaust conduit, an outlet header fluidly coupled to an exhaust pipe, a housing that defines an internal jacket space, and a plurality of metal tubes that extend through the internal jacket space between the inlet header and the outlet header, the housing defining a heat transfer fluid inlet and a heat transfer fluid outlet, the heat transfer fluid inlet and the heat transfer fluid outlet being fluidly coupled to the interior heat transfer passage of the casing of the vacuum distillation vessel by a fluid return conduit and a fluid delivery conduit, respectively.

8. The mobile vacuum distillation unit set forth in claim 1, wherein the shell comprises a base wall, which defines the enclosed interior space, and a supplemental wall that surrounds the base wall to define a gap between the base wall and the supplemental wall, the gap being filled with a temperature-regulating substance.

9. A mobile vacuum distillation unit comprising:
   a tractor unit powered by an engine that produces an exhaust gas;
   a transportable support platform connected to the tractor unit, the transportable support platform comprising a plurality of wheels adapted for road engagement;
   a shell that defines an enclosed interior space, the shell being mounted to the transportable support platform;
   a vacuum distillation vessel housed within the enclosed interior space of the shell, the vacuum distillation vessel having a casing that defines a vacuum distillation chamber, the casing also defining an outlet of the vacuum distillation vessel, wherein polymer-containing articles that contain releasable volatile organic compounds are housed within the vacuum distillation chamber of the vacuum distillation vessel;
   a condensate storage tank housed within the enclosed interior space of the shell, the condensate storage tank having a tank wall that defines an internal cavity;
   a condenser housed within the enclosed interior space of the shell, the condenser being fluidly coupled to the outlet of the vacuum distillation vessel and to an inlet of the condensate storage tank and being configured to condense volatile organic compound (VOC) vapor emissions received from the vacuum distillation chamber into a liquid condensate and to deliver the liquid condensate into the internal cavity of the condensate storage tank;
   a vacuum pump system in fluid communication with the vacuum distillation chamber of the vacuum distillation vessel, the vacuum pump system being operable to create a partial vacuum within the vacuum distillation chamber and to draw the VOC vapor emissions from the vacuum distillation chamber into the condenser; and an exhaust gas heat exchanger, the exhaust gas heat exchanger being fluidly coupled to the engine of the tractor unit by an engine exhaust conduit, the exhaust gas heat exchanger being configured to transfer heat from the exhaust gas produced by the engine to a heat transfer fluid and, further, to circulate the heat transfer fluid through an interior heat transfer passage defined in the casing of the vacuum distillation vessel.

10. The mobile vacuum distillation unit set forth in claim 9, wherein the condenser includes an inlet header, an outlet header, a housing that defines an internal jacket space, and a plurality of metal tubes that extend through the internal jacket space between the inlet header and the outlet header, and wherein the inlet header of the condenser is fluidly coupled to the outlet of the vacuum distillation vessel.

11. The mobile vacuum distillation unit set forth in claim 10, wherein the housing of the condenser defines a coolant inlet and a coolant outlet, the coolant inlet and the coolant outlet being fluidly coupled by a coolant conduit, and wherein a refrigeration device fluidly communicates with the coolant conduit.

12. The mobile vacuum distillation unit set forth in claim 9, wherein the exhaust gas heat exchanger includes an inlet header fluidly coupled to the engine exhaust conduit, an outlet header fluidly coupled to an exhaust pipe, a housing that defines an internal jacket space, and a plurality of metal tubes that extend through the internal jacket space between the inlet header and the outlet header, the housing defining a heat transfer fluid inlet and a heat transfer fluid outlet, the heat transfer fluid inlet and the heat transfer fluid outlet being fluidly coupled to the interior heat transfer passage of the casing of the vacuum distillation vessel by a fluid return conduit and a fluid delivery conduit, respectively.

13. The mobile vacuum distillation unit set forth in claim 9, further comprising one or more direct heaters configured to directly heat the casing of the vacuum distillation vessel.

14. The mobile vacuum distillation unit set forth in claim 9, wherein the vacuum pump system includes a low-vacuum roughing pump and a high-vacuum momentum transfer pump.

15. A mobile vacuum distillation unit comprising:
a transportable support platform;
a shell that defines an enclosed interior space, the shell being mounted to the transportable support platform and comprising a base wall, which defines the enclosed interior space, and a supplemental wall that surrounds the base wall to define a gap between the base wall and the supplemental wall, the gap being filled with a temperature-regulating substance;
a vacuum distillation vessel housed within the enclosed interior space of the shell, the vacuum distillation vessel having a casing that defines a vacuum distillation chamber that houses polymer-containing articles that contain releasable volatile organic compounds, the casing also defining an outlet of the vacuum distillation vessel;
a condensate storage tank housed within the enclosed interior space of the shell, the condensate storage tank having a tank wall that defines an internal cavity;
a condenser housed within the enclosed interior space of the shell, the condenser being fluidly coupled to the outlet of the vacuum distillation vessel and to an inlet of the condensate storage tank and being configured to condense volatile organic compound (VOC) vapor emissions received from the vacuum distillation chamber into a liquid condensate and to deliver the liquid condensate into the internal cavity of the condensate storage tank; and
a vacuum pump system in fluid communication with the vacuum distillation chamber of the vacuum distillation vessel, the vacuum pump system being operable to create a partial vacuum within the vacuum distillation chamber and to draw the VOC vapor emissions from the vacuum distillation chamber into the condenser.

16. The mobile vacuum distillation unit set forth in claim 15, wherein the temperature-regulating substance is a gas or a liquid.

17. The mobile vacuum distillation unit set forth in claim 15, wherein the temperature-regulating substance is a solid insulator.

18. The mobile vacuum distillation unit set forth in claim 15, further comprising a tractor unit to which the transportable support platform is connected, and an exhaust gas heat exchanger located within the enclosed interior space of the shell, the exhaust gas heat exchanger being fluidly coupled to an engine of the tractor unit by an engine exhaust conduit, the exhaust gas heat exchanger being configured to transfer heat from exhaust gas produced by the engine to a heat transfer fluid and, further, to circulate the heat transfer fluid through an interior heat transfer passage defined in the casing of the vacuum distillation vessel.

* * * * *